Nov. 13, 1923.  1,474,166
M. G. ROBERTS
WINDOW FOR AUTOMOBILE CURTAINS
Filed Jan. 12, 1920   2 Sheets-Sheet 1
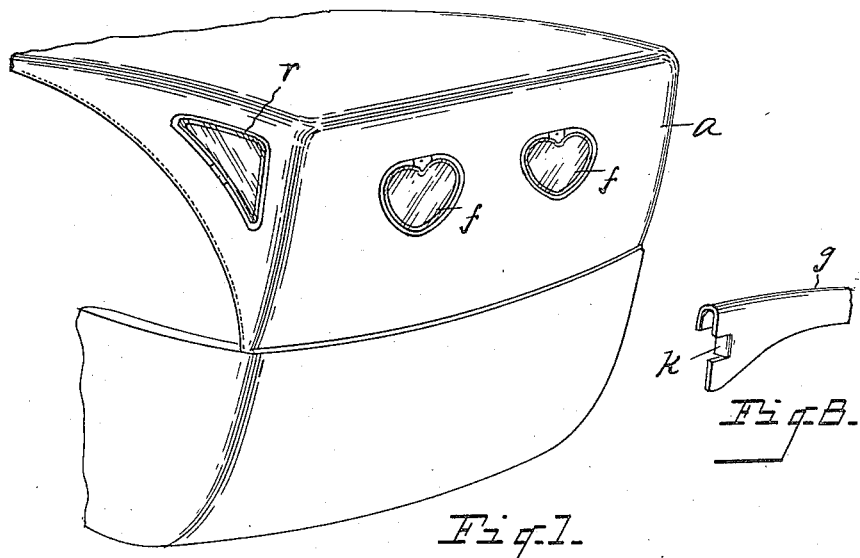
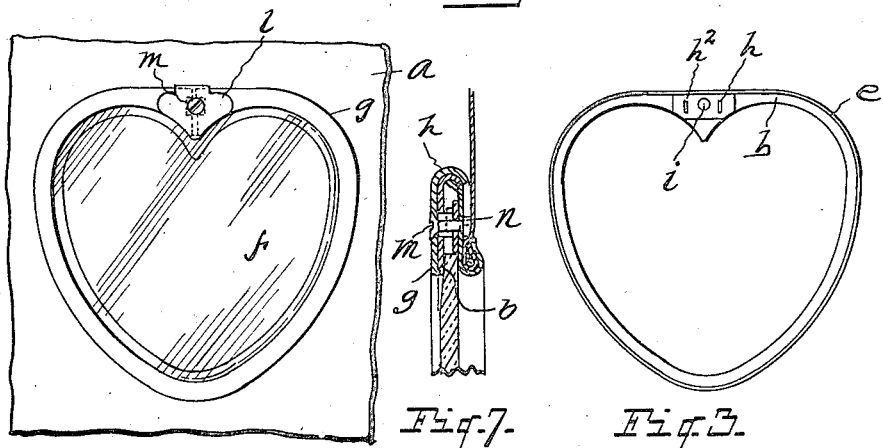
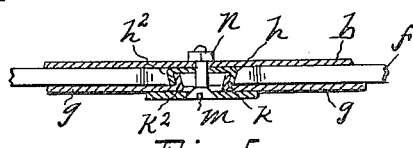
Inventor
MARSHALL G. ROBERTS.
By Ralzemond A. Parker
Attorney Nov. 13, 1923.  1,474,166
M. G. ROBERTS
WINDOW FOR AUTOMOBILE CURTAINS
Filed Jan. 12, 1920   2 Sheets-Sheet 2
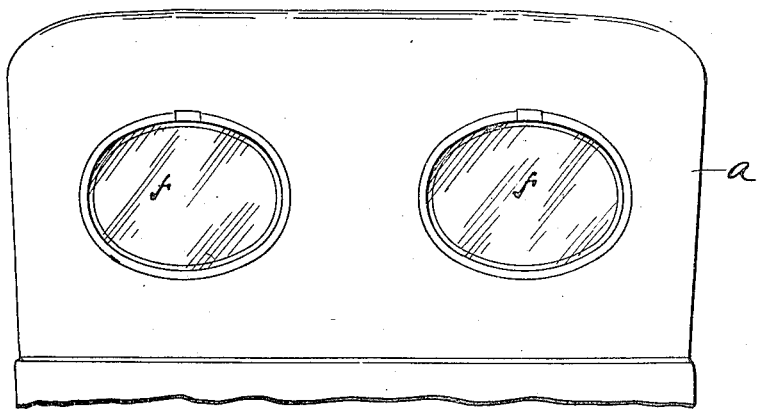
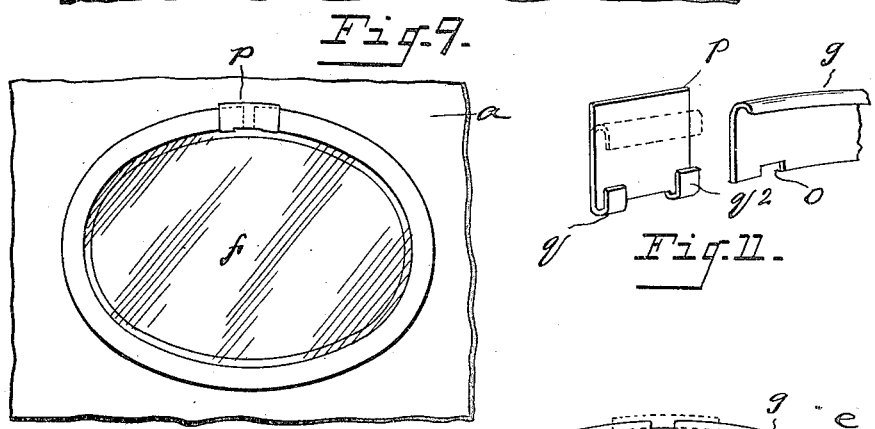
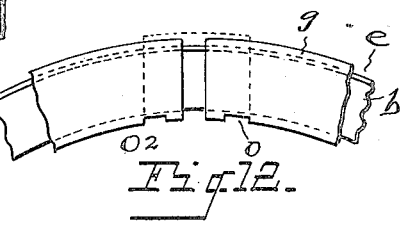
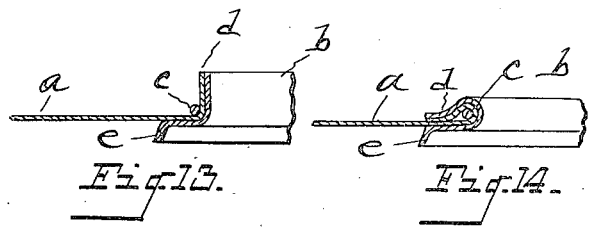
Inventor
MARSHALL G. ROBERTS.
By Raymond A. Parker
Attorney Patented Nov. 13, 1923.

1,474,166

UNITED STATES PATENT OFFICE.

MARSHAL G. ROBERTS, OF DETROIT, MICHIGAN.

WINDOW FOR AUTOMOBILE CURTAINS.

Application filed January 12, 1920. Serial No. 350,995.

*To all whom it may concern:*

Be it known that I, MARSHAL G. ROBERTS, citizen of the United States, residing at Detroit, county of Wayne, State of Michigan, have invented a certain new and useful Improvement in Windows for Automobile Curtains, and declare the following to be a full, clear, and exact description of the same, such as will enable others skilled in the art to which it pertains to make and use the same, reference being had to the accompanying drawings, which form a part of this specification.

My invention relates to windows for automobile curtains and means for securing the same in place.

The object is to provide a frame adapted to contain a plate glass window carried by the curtain fabric of a motor vehicle in such a manner that the window may be removed when desired.

In the drawings,—

Figure 1 is a perspective in which windows mounted in accordance with my construction are shown inset in the rear and side curtains of an automobile body.

Fig. 2 is an elevation of a single window carried by a section of said curtain.

Fig. 3 is an elevation of one type of window frame.

Fig. 4 shows a section of the frame crimped about the fabric curtain.

Fig. 5 is a detail view showing the method by which the frame is secured to the curtain.

Fig. 6 is a horizontal section of the locking mechanism which shows how the window is secured to the frame the curtain engaging frame being broken away.

Fig. 7 is a vertical section of the locking mechanism.

Fig. 8 is a perspective of one of the ends of the clamping ring.

Fig. 9 is a modified form of my device.

Fig. 10 sets forth the form shown in Fig. 9 in larger proportion and more in detail.

Fig. 11 shows the locking mechanism for the oval form shown in Fig. 9.

Fig. 12 is an elevation partly broken away showing the ends of the clamping ring, the clamp being removed.

Fig. 13 shows the frame preparatory to being crimped over the edge of the curtain.

Fig. 14 shows the frame crimped into position over the curtain edge.

Let $a$ represent an automobile curtain of desired fabric or material; $b$, a metal frame adapted to be crimped thereover provided with a face which lies adjacent to the exterior of the curtain and an outwardly-extending, circumferential flange $e$.

In order that the frame $b$, when crimped over the fabric of the curtain may be securely held thereon, the fabric is folded back upon itself, as at $d$, over a cord $c$ extending circumferentially of the opening in the curtain to be filled by the window. The position of the frame and curtain preparatory to this crimping operation is shown in Fig. 13; as the upstanding ledge of the frame is folded back over the curtain and cord carried thereby, it assumes the position shown in Figs. 5 and 14. The location of the cord will prevent the frame from being pulled away from the edge of the curtain. The outwardly-extending flange $e$ forms a seat for a plate glass window $f$. This window may be beveled as shown in the drawing, if desired, and the ledge $e$ would extend outwardly approximately the thickness of the edge thereof, so as to form a seat for the same and so as to receive adjacent its outer periphery an expansible clamping ring $g$. This clamping ring $g$ is formed with an inwardly-extending flange adapted to embrace the outer periphery of the flange $e$ carried by the frame. The face flange of the clamping ring therefore lies adjacent the outer surface of the plate glass window so as to hold the same firmly in position in its seat in the frame $b$.

This expansible ring $g$ has locking means which engage means carried by the frame, the clamping ring and frame being held together by means of a separate clamping member, hereinafter referred to.

The locking mechanism consists of outwardly-extending lugs $h$ and $h^2$ on either side of an opening $i$ provided in the frame. These lugs $h$ and $h^2$ are adapted to engage inwardly-extending lugs $k$ and $k^2$ carried by the expansible clamping ring in the manner shown in Fig. 6. The clamping ring $g$ is then held in this position, the lugs carried thereby engaging the lugs carried by the frame, by means of a plate $l$ provided with an inwardly-extending flanged edge which overlaps the clamping ring and frame and which is in turn held in place by means of a bolt $m$ provided with an adjustable nut $n$ passing therethru. The bolt is shown as adapted to be inserted exterior of the curtain and the nut fastened on the inside. By loosening the nut so as to remove the plate *l* the clamping ring may be sprung apart so as to permit the removal of the glass window from the frame.

It is apparent that this frame may be made in any desired shape and secured to the curtain in the manner here described. An oval form is shown in Fig. 9. An expansible clamping ring is here provided in manner similar to the clamping ring hereinbefore described. A somewhat different form of locking means is here shown adapted to this particular type of construction, but any form of locking mechanism which would serve to secure the clamping ring in position would prove satisfactory. In the clamping ring designed for use with the oval frame, and shown in Fig. 12, the ends are notched at *o* and *o²* and a plate *p* is provided with inturned flanges *q* and *q²* which are adapted to be received in the notches of the clamping ring. This plate *p* is turned over at the side opposite the flanged side to embrace the ring and frame so as to hold the same in position. This upsetting of the opposite side of the plate occurs after the flanges have been engaged in the notches of the ring. It is the method by which the plate is held securely in position.

Still another form of frame is shown at *r* in Fig. 1. Locking mechanism similar to that described for the oval type of frame will serve the purpose for a triangular window.

It will be understood that in this specification and in the claims where the word "curtain" is used, it refers to the conventional form of flexible side wall of a vehicle top such as the back or side of an automobile top which is ordinarily constructed of some flexible fabric such as leather. I do not intend the word "curtain" to refer to any particular type or form of curtain, but to be used in its general broad application as referring to a flexible side wall.

What I claim is:

1. The combination with a curtain having a window opening of a window frame comprising a frame member individually secured to the curtain at the opening and having a window pane engaging portion bent back upon the curtain, a second frame member having an oppositely disposed window pane engaging portion and provided with a circumferential flange adapted to encircle the window pane engaging portion of the first frame member and engage thereover and be removably secured in encircling relationship therearound.

2. The combination with a flexible curtain having a window opening of a window frame comprising a frame member individually secured to the curtain to be supported thereby, said member having a window pane engaging portion extending back over the curtain and provided with a marginal window pane supporting flange, a window pane receivable thereon for support, an expansible frame member removably receivable in encircling relationship about the marginal flange of the window pane engaging portion of the first member, and having a window pane engaging portion disposed opposite the window pane engaging portion of said first member and means for securing said second member in such encircling relationship about the first member.

3. In a curtain window frame, in combination, a frame member independently secured to the curtain for support and having a window pane engaging portion turned back upon the curtain, a window pane adapted to be seated thereagainst, said window pane engaging portion of the first member extended outwardly beyond the circumference of the window pane and turned over the edge thereof, an expansible clamping ring adapted to removably embrace the window pane engaging portion of the first frame member, said clamping ring having a window pane engaging portion disposed opposite the pane engaging portion of the first member and adapted to grip the window pane between said members and means releasably securing said clamping ring in such embracing relationship about said first member.

In testimony whereof, I sign this specification.

MARSHAL G. ROBERTS.